Patented Apr. 24, 1934

1,956,441

UNITED STATES PATENT OFFICE 1,956,441

METHOD OF AND COMPOUND FOR COATING TENNIS RACKET STRINGS

William E. Gledhill, Santa Barbara, Calif.

No Drawing. Application January 24, 1931, Serial No. 511,107

9 Claims. (Cl. 91—68)

This invention relates to improvements in compounds for treating the stringing material of tennis rackets such, for example, as gut, silk or any other material of this character.

The primary object of the present invention is to provide a sizing compound designed to be applied to the tennis racket strings for the purpose of strengthening and preserving the same and, where applied after the strings have been in use in a racket, for restoring worn portions of the surfaces thereof.

Another object of the invention is to provide a substance for application to tennis racket stringing, which does not simply provide a coating over the string when dry such, for example, as shellac and other substances do, but which only becomes completely effective upon exposure to light, such exposure causing the coating to harden and this hardening increases and becomes more wear resisting the more the strings coated therewith are exposed to the sunlight.

It is well known, of course, that numerous materials have been heretofore provided for coating tennis racket strings and other strings or cords of this character but these coatings are in the nature of shellac, which dries at once and does not thereafter change or alter its condition.

These substances only act for a certain length of time as a covering for the strings and they rapidly wear or flake off under the action of stresses applied to the strings when the racket is in use, so that their usefulness is relatively short lived, whereas with the present substance its complete effectiveness is not accomplished until exposed to the sunlight, the rays of which act to coagulate or solidify the colloidal particles of the ingredients to form a hard protecting and wear resisting surface.

The desired results are obtained by making use of the effect exerted by certain chemicals upon certain colloidal substances, which effect is to harden or set these substances, and to give them great tensile strength.

In the preparation of the present compound there are employed equal quantities of cooked startch solution and a solution of gum arabic. These solutions are used relatively thin or, in other words, of about the proper consistency required for label pasting. As an example, a suitable starch solution may be made by boiling one-half an ounce of starch in sixteen ounces of water and a suitable gum arabic solution may be made by dissolving six and three-quarter ounces of the gum in sixteen ounces of water.

To the mixture of equal parts cooked starch solution and gum arabic solution there is added an approximately equal quantity of a solution of any of the bichromates having the property of hardening colloids upon exposure to light, preferably the sodium, potassium or ammonium salt. The bichromate solution used may be of anywhere from 1 to 4% strength. The proportions, therefore, of the compound are approximately one part starch solution, one part gum arabic solution, and two parts bichromate solution, all of the solutions being made, of course, by mixing the substances with water.

As a result of actual experiment it is found that the present compound, when brushed on tennis racket strings and exposed to sunlight, more nearly approaches the texture and qualities of real sheep gut than any other compound now used, such as shellac, varnish or glue, and that it is able to take the impact and punishment of stroking the ball and adds from 25 to 100% to the life of the strings.

It is known that a synthetic gut may be made by twisting and drawing strands of silk under a desirable tension through an appropriate glue mixture and then water-proofing the strands by using certain chemical agents which are commonly employed as tanning agents for leather, among which are included potassium bichromate, and chromium and aluminum salts but by the use of glue of various sorts the resultant product is flaky, brittle and of low flexibility and, in addition to this, in order to be used, glue has to be heated and when mixed with any bichromate solution it becomes insoluble and will not bear repeated heatings.

The present starch-gum arabic-bichromate compound remains liquid in a container indefinitely. When applied and allowed to dry, then and then only does the exposure to sunlight harden and toughen the compound so as to obtain the desired results. For this reason it may be readily put up in containers and distributed for sale among users of tennis rackets and other stringed articles of this character without danger of it deteriorating in any manner.

It has also been found that the silver salts that are sensitive to light, as for example silver chloride, act somewhat like the bichromates specified, but if employed at all they should not displace more than 20% of the bichromate Chrome alum has a hardening effect upon colloids without exposure to sunlight; such exposure does not assist or change this effect. But its hardening effect is of a glassy, stiff, inelastic nature entirely different from the effect of the light sensitive bichromates of sodium, potassium and ammonium, which give a coating of the required tensile strength, elasticity and "liveness" of finish.

From the foregoing it will be readily seen that with the present compound a much better surface coating for strings of animal or vegetable character has been perfected than anything of a similar nature at present known.

Having thus described my invention, what I claim is:

1. The herein described method of coating and resurfacing strings, which consists in coating the same with a colloidal suspension having mixed therewith a light sensitive chemical having the property of hardening the colloidal substance after the suspension has been dried and upon exposure to sunlight.

2. The herein described method of coating and resurfacing strings, which consists in coating the same with a solution of starch, gum arabic and a bichromate, drying the same, and then exposing the strings to sunlight to effect the hardening of the starch and gum by the bichromate.

3. A compound for coating tennis racket and like strings, consisting of a solution of starch gum arabic, and a bichromate having the property of hardening colloids on exposure to sunlight.

4. A compound for coating tennis racket and like strings, consisting of a suspension of starch and gum arabic, and a solution of a bichromate constituting approximately 50% of the compound and of from 1 to 4% strength.

5. The herein described method of coating and resurfacing strings, which consists in coating the same with a solution containing starch, gum arabic and a light sensitive chemical having the property of hardening the starch and gum upon exposure to light, drying the solution, and then exposing the strings to actinic rays to effect the desired reaction between the chemical and the other ingredients.

6. The herein described method of resurfacing strings, which consists in coating the same with a solution containing starch, gum arabic and a light sensitive chemical having the property of hardening the starch and gum arabic upon exposure to light, and a chemical having the property of hardening the starch and gum arabic without exposure to light, drying the coated string, and then exposing the string to sunlight to effect the desired reaction between the light sensitive chemical and the starch and gum.

7. The herein described method of strengthening bodies of the nature of strings, cords, threads or the like, which consists in applying to the body a colloidal suspension containing a bichromate in solution therein, drying the body, and then exposing the body to actinic rays to effect the coagulation and hardening of the colloidal substance in and on the bodies.

8. The herein described method of strengthening bodies of the nature of strings, cords, threads and the like, which consists in applying to the body a solution of starch, gum arabic, and a light sensitive chemical having the property of coagulating the substances in solution, drying the body, and then exposing the body to actinic rays.

9. A compound for strengthening bodies of the nature of strings, cords, threads or the like, consisting of a colloidal suspension of starch, gum arabic, and a light sensitive chemical having the property of coagulating the suspension upon exposure to actinic rays.

WILLIAM E. GLEDHILL.